(12) United States Patent
Nakamura

(10) Patent No.: US 11,949,448 B2
(45) Date of Patent: Apr. 2, 2024

(54) SUBMARINE OPTICAL COMMUNICATION SYSTEM AND COMMUNICATION METHOD

(71) Applicant: NEC Corporation, Tokyo (JP)

(72) Inventor: Kohei Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/799,993

(22) PCT Filed: Feb. 2, 2021

(86) PCT No.: PCT/JP2021/003682
§ 371 (c)(1),
(2) Date: Aug. 16, 2022

(87) PCT Pub. No.: WO2021/176923
PCT Pub. Date: Sep. 10, 2021

(65) Prior Publication Data
US 2023/0104128 A1 Apr. 6, 2023

(30) Foreign Application Priority Data
Mar. 2, 2020 (JP) .................................. 2020-034572

(51) Int. Cl.
*H04B 10/00* (2013.01)
*H04B 10/073* (2013.01)
(Continued)

(52) U.S. Cl.
CPC .......... *H04B 10/073* (2013.01); *H04B 10/80* (2013.01); *H04Q 11/0005* (2013.01); *H04Q 2011/0016* (2013.01)

(58) Field of Classification Search
CPC .. H04B 10/073; H04B 10/80; H04B 10/0795; H04B 10/07955; H04B 10/07953;
(Continued)

(56) References Cited

U.S. PATENT DOCUMENTS 8,805,185 B2 * 8/2014 Okada ................. H04J 14/0221
398/91
2008/0304829 A1 * 12/2008 Sato .................... H04J 14/0221
398/79
(Continued)

FOREIGN PATENT DOCUMENTS

CN 105814817 A 7/2016
CN 109792294 A 5/2019
(Continued)

OTHER PUBLICATIONS

International Search Report for PCT Application No. PCT/JP2021/003682, dated Apr. 13, 2021.
(Continued)

*Primary Examiner* — Hanh Phan
(74) *Attorney, Agent, or Firm* — Sughrue Mion, PLLC

(57) ABSTRACT

In order to readily carry out communication between terminal stations, a submarine optical communication system includes a first terminal station including a first monitoring means for monitoring the signal quality of dummy light a first dummy light source that outputs dummy light to the second terminal station, and a first light transmitting means for transmitting an optical signal to the second terminal station, the optical signal including a first signal quality of the dummy light; and the second terminal station including a second dummy light source that outputs dummy light to the first monitoring means, a second monitoring means for monitoring the signal quality of the dummy light, and a light receiving means for receiving the optical signal.

10 Claims, 9 Drawing Sheets

(51) Int. Cl.
*H04B 10/80* (2013.01)
*H04Q 11/00* (2006.01)

(58) Field of Classification Search
CPC .............. H04B 10/07957; H04B 10/40; H04B 10/0773; H04Q 11/0005; H04Q 11/0062; H04Q 11/0066; H04Q 11/0067; H04J 14/02
USPC .... 398/16, 104, 105, 79, 33, 38, 25, 26, 27, 398/158, 159, 135, 136, 173, 30, 31, 32, 398/45, 48, 49
See application file for complete search history.

(56) References Cited

U.S. PATENT DOCUMENTS

| | | |
|---|---|---|
| 2012/0243879 A1 | 9/2012 | Nashimoto et al. |
| 2013/0004166 A1 | 1/2013 | Okada |
| 2014/0286635 A1 | 9/2014 | Kaneko et al. |
| 2016/0197696 A1 | 7/2016 | Inoue |
| 2019/0253139 A1* | 8/2019 | Satou ............... H04B 10/07955 |
| 2020/0244386 A1 | 7/2020 | Yamamoto |
| 2020/0358534 A1 | 11/2020 | Ootaki |

FOREIGN PATENT DOCUMENTS

| | | |
|---|---|---|
| EP | 3605878 B1 | 2/2020 |
| JP | 2012-182725 A | 9/2012 |
| JP | 2019-004336 A | 1/2019 |
| WO | 2015/045311 A1 | 4/2015 |
| WO | 2018/051935 A1 | 3/2018 |
| WO | 2019/151067 A1 | 8/2019 |

OTHER PUBLICATIONS

English translation of Written opinion for PCT Application No. PCT/JP2021/003682, dated Apr. 13, 2021.
Extended European Search Report for EP Application No. 21764306.3, dated Jul. 19, 2023.
CN Office Action for CN Application No. 202180018049.8, dated Jan. 2, 2024 with English Translation.

* cited by examiner

SUBMARINE OPTICAL COMMUNICATION SYSTEM AND COMMUNICATION METHOD

This application is a National Stage Entry of PCT/JP2021/003682 filed on Feb. 2, 2021, which claims priority from Japanese Patent Application 2020-034572 filed on Mar. 2, 2020, the contents of all of which are incorporated herein by reference, in their entirety.

TECHNICAL FIELD

The present invention relates to a submarine optical communication system and a communication method that readily enable communication between terminal stations.

BACKGROUND ART

In a submarine optical communication system, a wavelength multiplex optical signal is transmitted and received between terminal stations via a submarine cable. An intensity of an optical signal being output from a terminal station that transmits a wavelength multiplex optical signal (hereinafter, referred to as a "transmitting terminal station") is determined in consideration of transmission characteristics of a submarine cable in such a way that a terminal station that receives a wavelength multiplex optical signal (hereinafter, referred to as a "receiving terminal station") receives the optical signal with appropriate signal quality.

Thus, before the system is operated, dummy light is output from the transmitting terminal station to the receiving terminal station via a transmission line in order to acquire transmission characteristics. With this, the receiving terminal station acquires signal quality of the dummy light that is received under an influence of the transmission characteristics of the submarine cable. Further, the receiving terminal station notifies the transmitting terminal station of the acquired signal quality of the dummy light, and the transmitting terminal station adjusts an intensity of an optical signal to be output, based on the notified signal quality.

PTLs 1 and 2 each disclose a communication system that has already been put into operation by providing a terminal station with an optical transponder.

CITATION LIST

Patent Literature

[PTL 1] International Patent Publication No. WO 2018/051935
[PTL 2] International Patent Publication No. WO 2015/045311

SUMMARY OF INVENTION

Technical Problem

However, for example, there may be a case in which a terminal station is not provided with communication equipment (e.g., an optical transponder and the like) before the submarine optical communication system is operated. In this case, when the acquired signal quality of the dummy light is notified from the receiving terminal station to the transmitting terminal station, it is required to establish communication between the terminal stations by using a line outside of the submarine optical communication system (specifically, a line other than the submarine cable that connects the terminal stations to each other), which causes complexity.

The present invention has been made in view of the above-mentioned problem, and an object of the present invention is to provide a submarine optical communication system and a communication method that readily enable communication between terminal stations.

Solution to Problem

A submarine optical communication system according to the present invention includes: a first terminal station; and a second terminal station being connected to the first terminal station via a submarine cable, wherein
the submarine cable accommodates a first transmission line, a second transmission line, and a third transmission line that enable light to propagate therein,
the first terminal station includes:
a first monitoring means for monitoring first signal quality of dummy light from the second terminal station, the dummy light being acquired via the first transmission line;
a first dummy light source that outputs dummy light to the second terminal station via the second transmission line; and
a light transmitting means for transmitting an optical signal to the second terminal station via the third transmission line, the optical signal including the first signal quality of dummy light from the second terminal station, and
the second terminal station includes:
a second dummy light source that outputs dummy light to the first monitoring means via the first transmission line;
a second monitoring means for monitoring second signal quality of dummy light from the first dummy light source, the dummy light being acquired via the second transmission line; and
a light receiving means for receiving the optical signal including the first signal quality from the third transmission line.

Further, the present invention is a communication method in a submarine optical communication system including a submarine cable that accommodates a first transmission line, a second transmission line, and a third transmission line that enable light to propagate therein, a first terminal station, and a second terminal station being connected to the first terminal station via the submarine cable, the communication method including,
by the first terminal station:
monitoring first signal quality of dummy light from the second terminal station, the dummy light being acquired via the first transmission line;
outputting dummy light to the second terminal station via the second transmission line; and
transmitting an optical signal to the second terminal station via the third transmission line, the optical signal including the first signal quality of dummy light from the second terminal station, and
by the second terminal station:
outputting dummy light to the first terminal station via the first transmission line;
monitoring second signal quality of dummy light from the first dummy light source, the dummy light being acquired via the second transmission line; and
receiving the optical signal including the first signal quality from the third transmission line.

Advantageous Effects of Invention

According to the present invention, a submarine optical communication system and a communication method that readily enable communication between terminal stations can be provided.

EXAMPLE EMBODIMENT

First Example Embodiment

Figure 1:
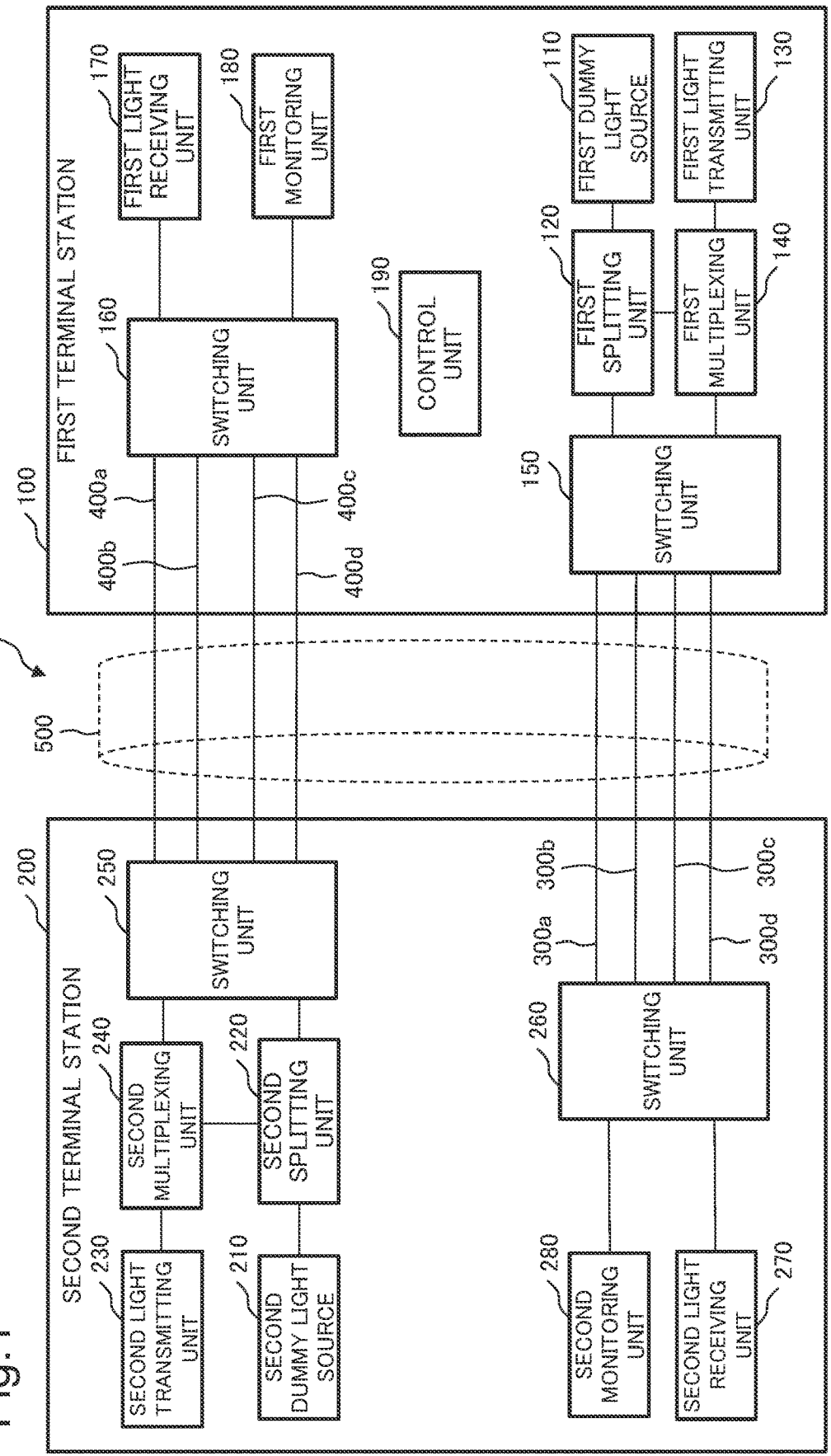
FIG. 1 is a block diagram illustrating a configuration example of a submarine optical communication system according to a first example embodiment of the present invention.
Figure 2:
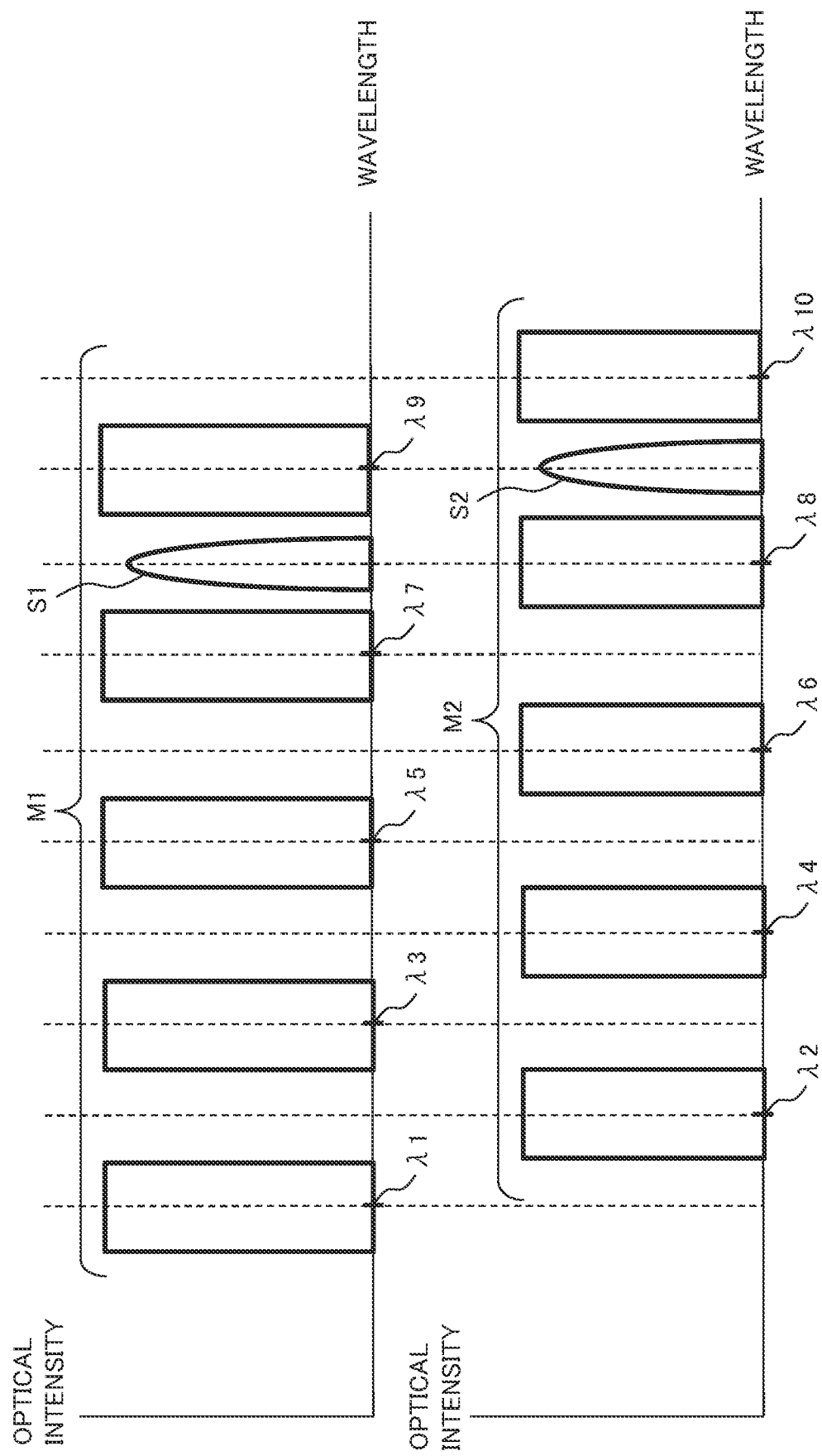
FIG. 2 is a diagram for explaining the submarine optical communication system according to the first example embodiment of the present invention.
Figure 3:
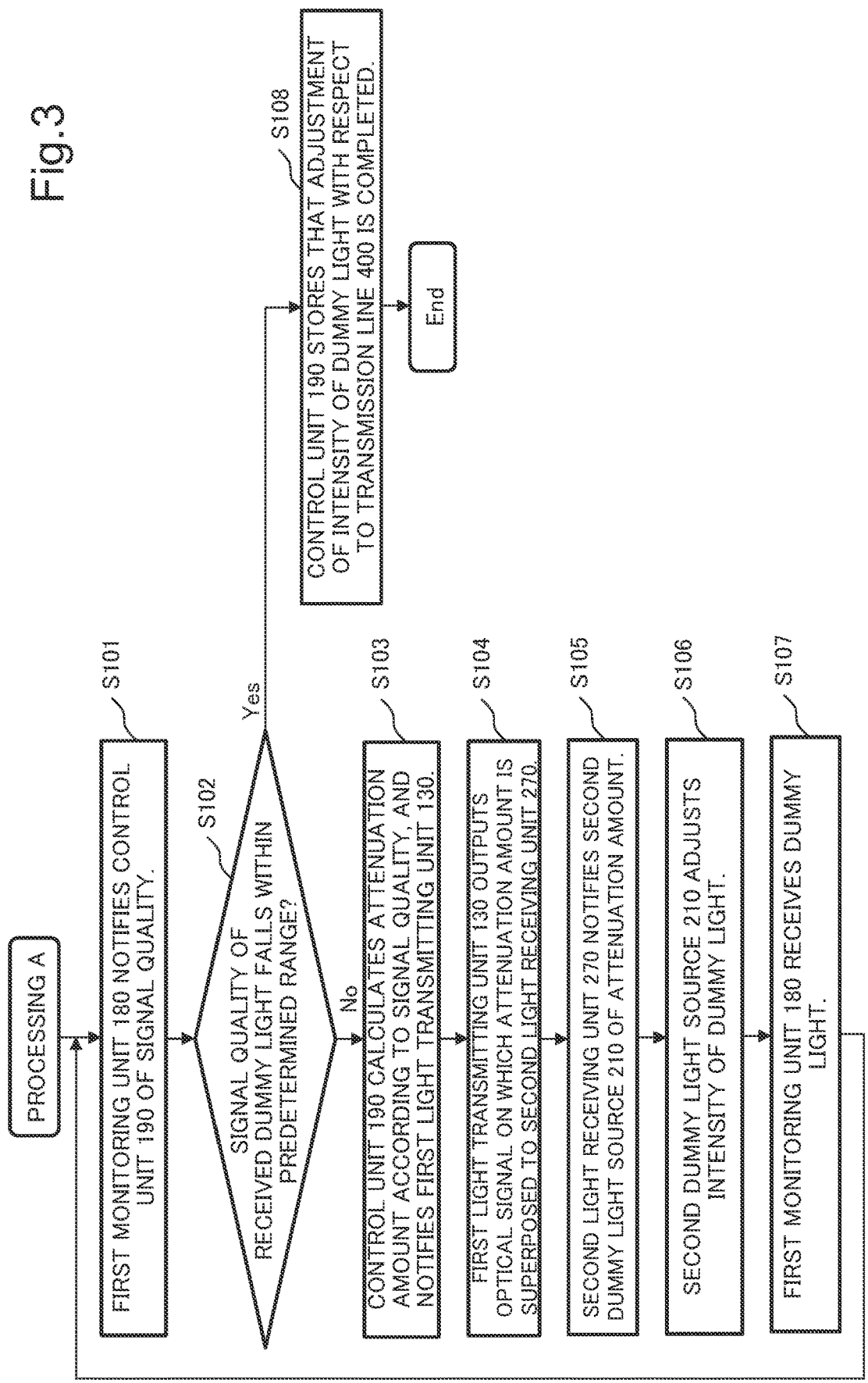
FIG. 3 is a flowchart for explaining the submarine optical communication system according to the first example embodiment of the present invention.
Figure 4:
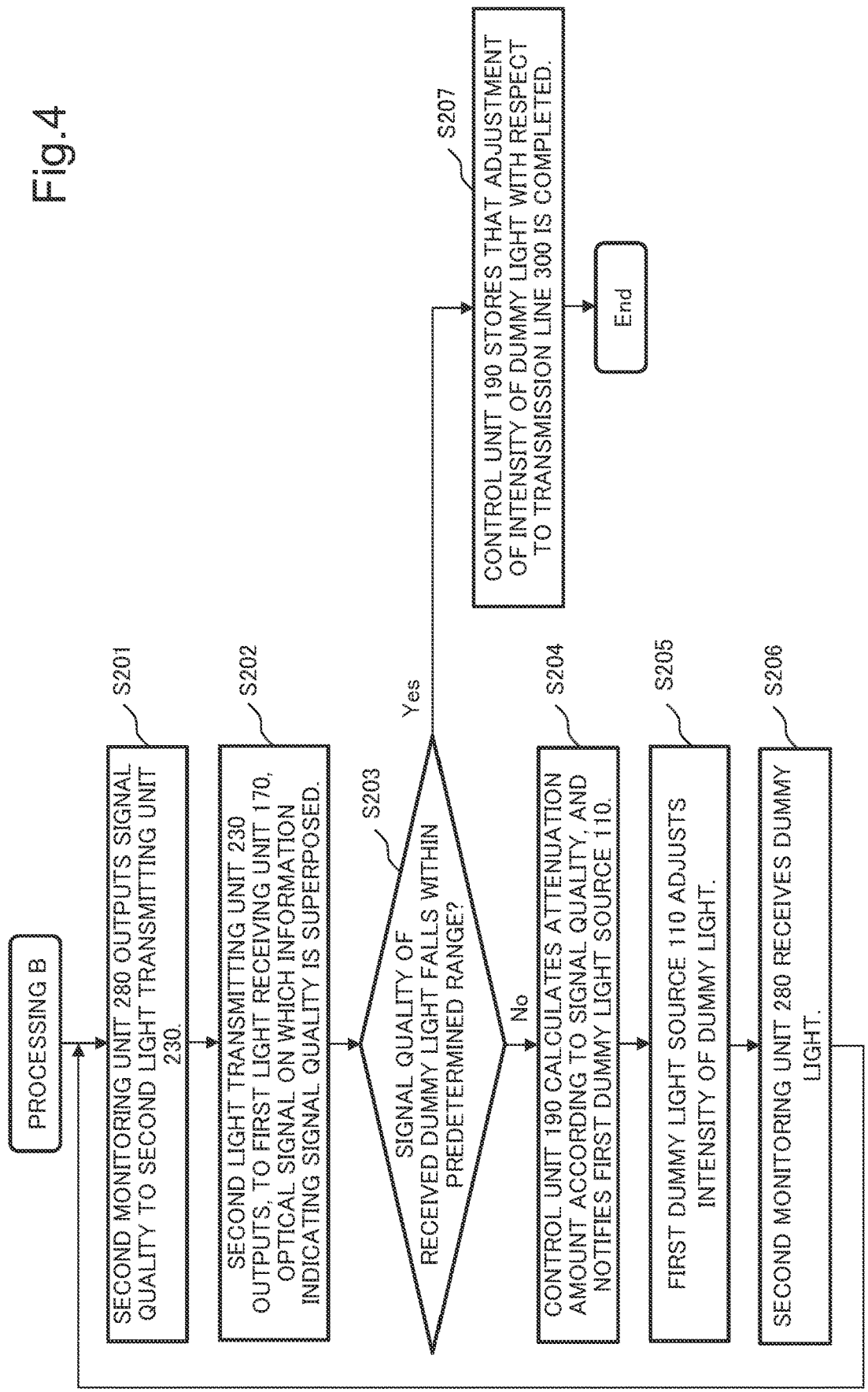
FIG. 4 is a flowchart for explaining the submarine optical communication system according to the first example embodiment of the present invention.
Figure 5:
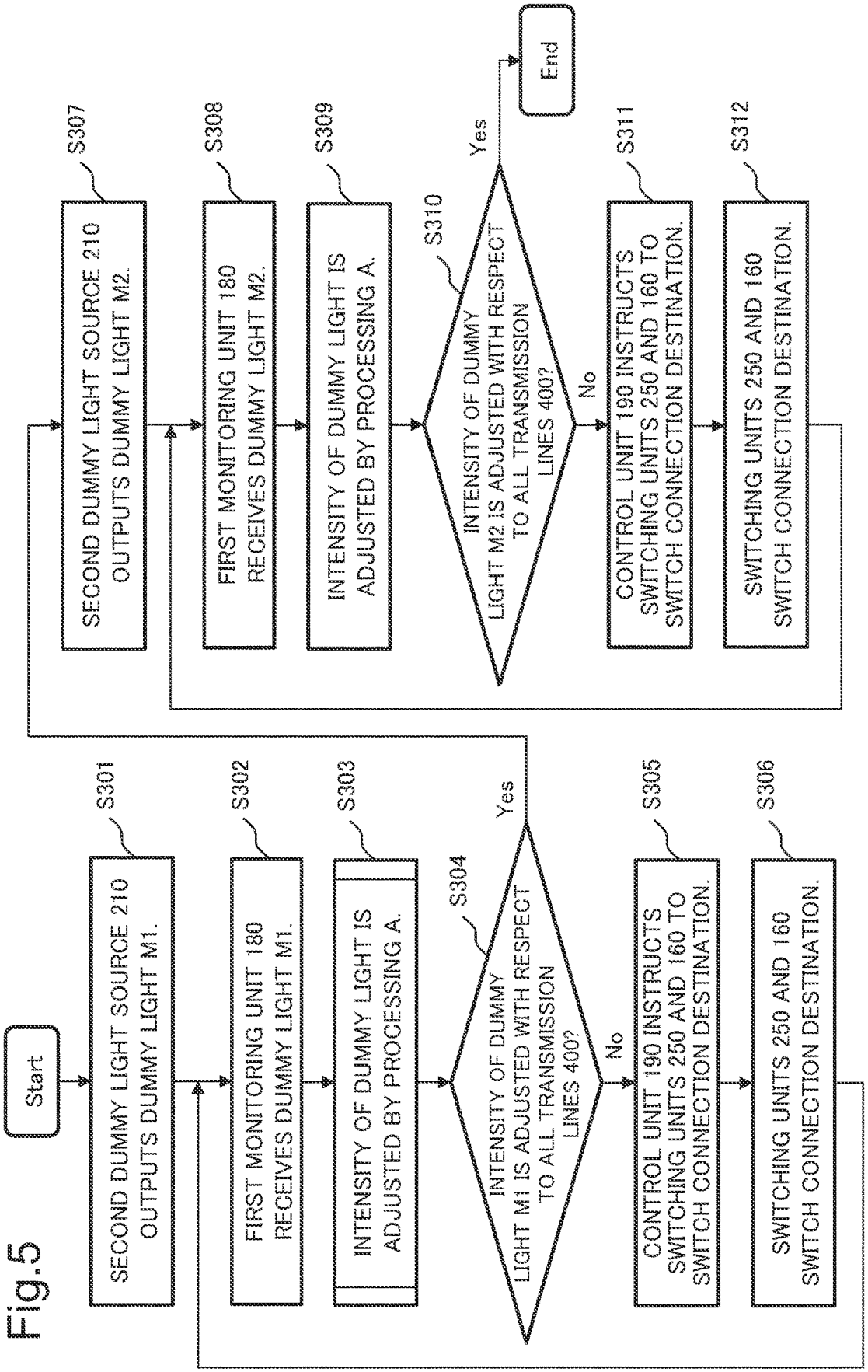
FIG. 5 is a flowchart illustrating an operation example of the submarine optical communication system according to the first example embodiment of the present invention.
Figure 6:
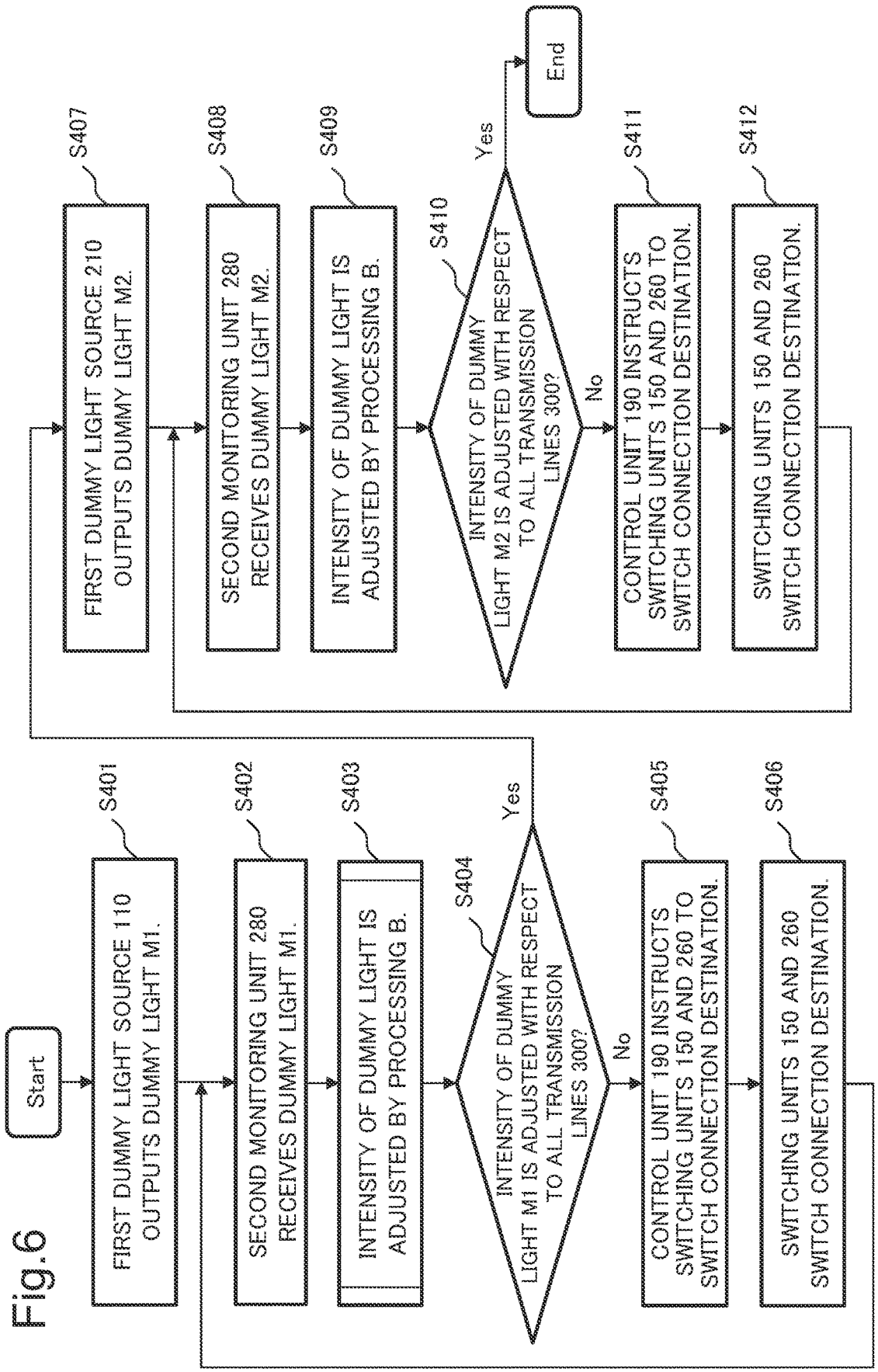
FIG. 6 is a flowchart illustrating an operation example of the submarine optical communication system according to the first example embodiment of the present invention.

A submarine optical communication system 1 according to a first example embodiment is explained based on FIGS. 1, 2, 3, 4, 5, and 6. FIG. 1 is a block diagram illustrating a configuration example of the submarine optical communication system 1. Further, FIG. 2 is a diagram illustrating one example of dummy lights M1 and M2 and optical signals S1 and S2 in the submarine optical communication system 1. FIG. 3 is a flowchart for explaining processing A in the submarine optical communication system 1. FIG. 4 is a flowchart for explaining processing B in the submarine optical communication system 1. Each of FIGS. 5 and 6 is a diagram for explaining an operation example of the submarine optical communication system 1.

A configuration of the submarine optical communication system 1 is explained. As illustrated in FIG. 1, the submarine optical communication system 1 includes a first terminal station 100, a second terminal station 200, transmission lines 300a, 300b, 300c, and 300d, transmission lines 400a, 400b, 400c, and 400d, and a submarine cable 500. Note that, in the following explanation, when there is no need to distinguish the transmission lines 300a to 300d from one another, each of the transmission lines 300a to 300d is referred to as a transmission line 300. Further, when there is no need to distinguish the transmission lines 400a to 400d from one another, each of the transmission lines 400a to 400d is referred to as a transmission line 400. For example, a plurality of transmission lines 300 and a plurality of transmission lines 400 are accommodated in the same submarine cable 500.

As illustrated in FIG. 1, the first terminal station 100 includes a first dummy light source 110, a first splitting unit 120, a first light transmitting unit 130, a first multiplexing unit 140, a switching unit 150, a switching unit 160, a first light receiving unit 170, a first monitoring unit 180, and a control unit 190.

The first terminal station 100 and the second terminal station 200 are connected to each other via the submarine cable 500 that accommodates the plurality of transmission lines 300 and the plurality of transmission lines 400. The transmission lines 300 and 400 are explained. For example, the transmission lines 300 and 400 are optical fibers. Light propagating in the transmission lines 300 and 400 is amplified by an optical amplifier provided to the submarine cable 500. For example, the optical amplifier is an Erbium-Doped Fiber Amplifier (EDFA). The transmission lines 300 and 400 transmit the light while amplifying the light. The transmission line 300 transmits the light from the first terminal station 100 to the second terminal station 200. The transmission line 400 transmits the light from the second terminal station 200 to the first terminal station 100.

The first dummy light source 110 is explained. The first dummy light source 110 outputs dummy light. The dummy light includes a plurality of lights having a predetermined center wavelength and a predetermined bandwidth. For example, the first dummy light source 110 includes an Amplified Spontaneous Emission (ASE) light source and a Wavelength Selective Switch (WSS). For example, the ASE light source incudes an Erbium-Doped Fiber (EDF). The EDF can output ASE light by inputting excitation light to the EDF. In this occasion, the ASE light released from the EDF is broadband light. Further, the WSS is an optical filter capable of setting an attenuation amount for each wavelength. The ASE light that is output from the ASE light source is input to the WSS having an attenuation amount that is set for each wavelength, and thus dummy light having a freely-selected intensity for each wavelength is output from the WSS. In this occasion, an attenuation amount of the WSS for each wavelength is adjusted, and thus an optical intensity of the dummy light for each wavelength can be adjusted to a predetermined value.

The first dummy light source 110 outputs any one of the dummy light M1 and the dummy light M2 illustrated in FIG. 2. Note that, in the following explanation, when there is no need to distinguish the dummy light M1 and the dummy light M2 from each other, each of the dummy light M1 and the dummy light M2 is referred to as dummy light. As illustrated in FIG. 2, the dummy light M1 includes light having wavelengths $\lambda 1$, $\lambda 3$, $\lambda 5$, $\lambda 7$, and $\lambda 9$. Meanwhile, as illustrated in FIG. 2, the dummy light M2 includes light having wavelengths $\lambda 2$, $\lambda 4$, $\lambda 6$, $\lambda 8$, and $\lambda 10$. Note that the wavelengths of the light included in the dummy light are set to have an equal interval therebetween. For example, an interval between $\lambda 1$ and $\lambda 2$ is equal to an interval between $\lambda 4$ and $\lambda 5$.

Under control of the control unit 190, the first dummy light source 110 outputs any one of the dummy light M1 and the dummy light M2. For example, when the first dummy light source 110 includes the ASE light source and the WSS, the control unit 190 performs control in such a way that the WSS blocks light having a freely-selected bandwidth with the wavelengths λ2, λ4, λ6, λ8, and λ10 as center wavelengths. With this, the first dummy light source 110 outputs the dummy light M1 including the light having the wavelengths λ1, λ3, λ5, λ7, and λ9, of the ASE light that is output from the ASE light source. Meanwhile, when the control unit 190 controls the WSS to block light having a freely-selected bandwidths with the wavelengths λ1, λ3, λ5, λ7, and λ9 as center wavelengths, the first dummy light source 110 outputs the dummy light M2. In this manner, part of the dummy light is blocked, and thus an intensity of light generated outside the band of the dummy light at the time of transmission can be detected on a reception side for each wavelength. With this, each of the first monitoring unit 180 and a second monitoring unit 280, which will be described later, is capable of acquiring a noise component for each wavelength. For example, when receiving the dummy light M1, each of the first monitoring unit 180 and the second monitoring unit 280 acquires an average value of optical intensities at the wavelength λ2 and the wavelength λ4 as a noise component at the wavelength λ3.

Further, the first dummy light source 110 is controlled by the control unit 190 in such a way as to output dummy light having an optical intensity of the light at each wavelength that is equal to each other. For example, the control unit 190 adjusts an attenuation amount for each wavelength at the WSS included in the first dummy light source 110, and thus an optical intensity of light included in the dummy light at each of the wavelengths is equalized.

As illustrated in FIG. 1, the first dummy light source 110 is connected to the first splitting unit 120. The dummy light being output from the first dummy light source 110 is input to the first splitting unit 120.

The first splitting unit 120 is explained. The first splitting unit 120 splits the input dummy light, and outputs resultant light of splitting. For example, the first splitting unit 120 is an optical coupler. As illustrated in FIG. 1, the first splitting unit 120 splits the dummy light being output from the first dummy light source 110, and outputs resultant light of splitting to the first multiplexing unit 140 and the switching unit 150.

The first light transmitting unit 130 is explained. The first light transmitting unit 130 superposes an electric signal, which indicates the attenuation amount acquired by the control unit 190, based on signal quality of dummy light received by the first monitoring unit 180, on an optical signal, and outputs a resultant signal of superposing. The optical signal being output from the first light transmitting unit 130 is input to the first multiplexing unit 140.

Further, the first light transmitting unit 130 superposes an electric signal, which indicates an instruction from the control unit 190 to each element provided in the second terminal station 200, on an optical signal, and outputs a resultant signal of superposing. Specifically, the first light transmitting unit 130 outputs an instruction from the control unit 190 to a second dummy light source 210, a second light transmitting unit 230, switching units 250 and 260, a second light receiving unit 270, and the second monitoring unit 280, in a form of an optical signal.

A wavelength of the optical signal being output from the first light transmitting unit 130 is controlled by the control unit 190 in such a way as to be different from a wavelength of the dummy light being output from the first dummy light source 110. For example, when the control unit 190 instructs the first dummy light source 110 to output the dummy light M1, the first light transmitting unit 130 outputs the optical signal S1 having the wavelength λ8, for example, as illustrated in FIG. 2. Further, when the control unit 190 instructs the first dummy light source 110 to output the dummy light M2, the first light transmitting unit 130 outputs the optical signal S2 having the wavelength λ9, for example, as illustrated in FIG. 2. With this, the dummy light being output from the first splitting unit 120 and the optical signal can be prevented from interfering with each other at the time of multiplexing at the first multiplexing unit 140.

The first multiplexing unit 140 is explained. The first multiplexing unit 140 multiplexes the input light, and outputs resultant light of multiplexing. For example, the first multiplexing unit 140 is an optical coupler. The first multiplexing unit 140 multiplexes the dummy light from the first splitting unit 120 and the optical signal from the first light transmitting unit 130, and outputs resultant light of multiplexing to the switching unit 150.

The switching unit 150 is explained. The switching unit 150 includes two input ports and a plurality of output ports. One of the input ports of the switching unit 150 is connected to the first splitting unit 120. Further, another input port of the switching unit 150 is connected to the first multiplexing unit 140. Each of the plurality of output ports of the switching unit 150 is connected to the transmission line 300.

The switching unit 150 switches the output port to be connected to the input port by an instruction from the control unit 190, thereby being capable of switching an output destination of the light being input from the input port. For example, the switching unit 150 is capable of switching an output destination of the dummy light, which is input from the first splitting unit 120, from the transmission line 300a to the transmission line 300b.

The switching unit 160 is explained. The switching unit 160 includes a plurality of input ports and two output ports. Each of the plurality of input ports of the switching unit 160 is connected to the transmission line 400. One of the output ports of the switching unit 160 is connected to the first monitoring unit 180 to be described later. Further, another output port of the switching unit 160 is connected to the first light receiving unit 170 to be described later.

The switching unit 160 switches the output port to be connected to the input port by an instruction from the control unit 190, thereby being capable of switching a transmission line to be connected to a connection destination of the input port. For example, the switching unit 160 is capable of switching a transmission line, which is connected to the first monitoring unit 180, from the transmission line 400a to the transmission line 400b.

The first light receiving unit 170 is explained. The first light receiving unit 170 is connected to the switching unit 160 described above. The first light receiving unit 170 receives an optical signal from the second light transmitting unit 230 via the switching unit 160.

The first light receiving unit 170 receives, from the second light transmitting unit 230, an optical signal including the signal quality of the dummy light, which is output from the first dummy light source 110 and received by the second monitoring unit 280 via the transmission line 300. The first light receiving unit 170 notifies the control unit 190 of the signal quality of the dummy light, which is included in the received optical signal.

The first monitoring unit 180 is explained. The first monitoring unit 180 receives dummy light, and acquires signal quality of the received dummy light. For example, the first monitoring unit 180 is an optical spectrum analyzer. As illustrated in FIG. 1, the first monitoring unit 180 is connected to the output port of the switching unit 160.

The first monitoring unit 180 acquires the signal quality (first signal quality) of the received dummy light. For example, the signal quality is a Signal-to-Noise Ratio (SNR). Herein, for example, an SNR is acquired in the following manner. It is assumed that an intensity of the dummy light at the time of reception at the first monitoring unit 180, for each transmissive band (hereinafter, referred to as a "transmission band") of the WSS included in the second dummy light source 210 is a signal component. Further, an intensity of the light generated from an end of the transmission band to the adjacent transmission band of the dummy light at the time of reception is acquired as a noise component. When, in a specific transmission band, a transmission band that is adjacent to both a long wavelength side and a short wavelength side is present, an average value of an intensity of the light, which is generated from one end of the specific transmission band on the long wavelength side to an adjacent transmission band on the long wavelength side, and an intensity of light, which is generated from one end of the specific transmission band on the short wavelength side to an adjacent transmission band on the short wavelength side, is acquired as a noise component. Meanwhile, when, in a specific transmission band, a transmission band that is adjacent to only one of the long wavelength side and the short wavelength side is present, an average value of an intensity of the light, which is generated in a band from one end of the specific transmission band on an adjacent transmission band side to the adjacent transmission band (hereinafter, referred to as a "measurement band"), and an intensity of the light, which is generated in the same bandwidth as that of the measurement band from another end of the specific transmission band to an opposite side of the adjacent transmission band, is acquired as a noise component. The first monitoring unit 180 acquires a ratio of the signal component and the noise component in the transmission band, as an SNR in the transmission band.

The control unit 190 is explained. The control unit 190 is connected to the first dummy light source 110, the first splitting unit 120, the first light transmitting unit 130, the first multiplexing unit 140, the switching units 150 and 160, the first light receiving unit 170, and the first monitoring unit 180, in the first terminal station 100 via wiring lines that are not illustrated. With this, the control unit 190 is capable of controlling each of the elements in the first terminal station 100. Further, the control unit 190 is connected to the second dummy light source 210, a second splitting unit 220, the second light transmitting unit 230, a second multiplexing unit 240, the switching units 250 and 260, the second light receiving unit 270, and the second monitoring unit 280, in the second terminal station 200 via the first light transmitting unit 130. With this, the control unit 190 is capable of controlling each of the elements in the second terminal station 200 via the first light transmitting unit 130.

As illustrated in FIG. 1, the second terminal station 200 includes the second dummy light source 210, the second splitting unit 220, the second light transmitting unit 230, the second multiplexing unit 240, the switching units 250 and 260, the second light receiving unit 270, and the second monitoring unit 280.

The second dummy light source 210 has a configuration and functions that are similar to those of the first dummy light source 110. The second dummy light source 210 is connected to the second splitting unit 220. Dummy light being output from the second dummy light source 210 is input to the second splitting unit 220.

The second splitting unit 220 has a configuration and functions that are similar to those of the first splitting unit 120. The second splitting unit 220 splits the dummy light being output from the second dummy light source 210, and outputs resultant light of splitting to the second multiplexing unit 240 and the switching unit 250.

The second light transmitting unit 230 superposes an electric signal, which indicates the signal quality of the dummy light acquired by the second monitoring unit 280, on an optical signal, and outputs a resultant signal of superposing. The optical signal being output from the second light transmitting unit 230 is input to the second multiplexing unit 240. Similarly to the first light transmitting unit 130, a wavelength of the optical signal being output from the second light transmitting unit 230 is controlled by the control unit 190 in such a way as to be different from a wavelength of the dummy light being output from the second dummy light source 210.

Further, the second multiplexing unit 240 multiplexes the dummy light from the second splitting unit 220 and the optical signal from the second light transmitting unit 230, and outputs resultant light of multiplexing to the switching unit 250.

The switching unit 250 is explained. The switching unit 250 includes two input ports and a plurality of output ports. One of the input ports of the switching unit 250 is connected to the second splitting unit 220. Further, another input port of the switching unit 250 is connected to the second multiplexing unit 240. Each of the plurality of output ports of the switching unit 250 is connected to the transmission line 400.

The switching unit 250 switches the output port to be connected to the input port by an instruction from the control unit 190, thereby being capable of switching an output destination of the light being input from the input port. For example, the switching unit 250 is capable of switching an output destination of the dummy light, which is input from the second splitting unit 220, from the transmission line 400a to the transmission line 400b.

The switching unit 260 is explained. The switching unit 260 includes a plurality of input ports and two output ports. Each of the plurality of input ports of the switching unit 260 is connected to the transmission line 300. One of the output ports of the switching unit 260 is connected to the second monitoring unit 280 to be described later. Further, another output port of the switching unit 260 is connected to the second light receiving unit 270 to be described later.

The switching unit 260 switches the output port to be connected to the input port by an instruction from the control unit 190, thereby being capable of switching the transmission line to be connected to a connection destination of the input port. For example, the switching unit 260 is capable of switching a transmission line, which is connected to the second monitoring unit 280, from the transmission line 300a to the transmission line 300b.

The second light receiving unit 270 is explained. The second light receiving unit 270 is connected to the switching unit 260 described above. The first light receiving unit 170 receives an optical signal from the first light transmitting unit 130 via the switching unit 260.

Further, the second light receiving unit 270 receives, from the first light transmitting unit 130, an optical signal including the attenuation amount, which is acquired by the control unit 190, based on the signal quality of the dummy light received by the first monitoring unit 180. The second light receiving unit 270 notifies the second dummy light source 210 of the attenuation amount, which is included in the received optical signal.

The second monitoring unit 280 includes functions and a configuration that are similar to those of the first monitoring unit 180. The second monitoring unit 280 acquires signal quality of the received dummy light (second signal quality).

Note that the second monitoring unit 280 is connected to the output port of the switching unit 260.

The control unit 190 adjusts an intensity of the dummy light at the second dummy light source 210 for each transmission line 400, based on the signal quality of the dummy light acquired by the first monitoring unit 180. By using FIG. 3, explanation is made on processing (processing A) in which the control unit 190 adjusts the intensity of the dummy light at the second dummy light source 210. FIG. 3 is a flowchart illustrating an operation in the processing A.

The first monitoring unit 180 receives the dummy light from the second dummy light source 210 via the transmission line 400, and notifies the control unit 190 of the signal quality of the received dummy light (S101).

The control unit 190 determines whether the signal quality of the dummy light acquired by the first monitoring unit 180 falls within a predetermined range (S102).

When the signal quality of the dummy light does not fall within the predetermined range (No in S102), the control unit 190 calculates an attenuation amount according to the signal quality for each wavelength, and notifies the first light transmitting unit 130 (S103). For example, when the signal quality of the dummy light, which is received via the transmission line 400, at the wavelength λ4 is lower than a threshold value, the control unit 190 notifies the first light transmitting unit 130 of an attenuation amount based on a difference between the signal quality and the threshold value, as a new attenuation amount with respect to λ4 at the second dummy light source 210, in place of the attenuation amount of the WSS of the second dummy light source 210 with respect to λ4. For example, when the signal quality at λ4 is lower than the threshold value, the control unit 190 performs notification of an attenuation amount smaller than the current attenuation amount, as a new attenuation amount. With this, an attenuation amount with respect to λ4 at the WSS included in the dummy light is reduced, and hence the signal quality of the light at λ4 can be improved.

The first light transmitting unit 130 modulates the light, based on the electric signal indicating the attenuation amount notified by the control unit 190, and outputs the modulated optical signal (S104). In this occasion, under control of the control unit 190, the first light transmitting unit 130 outputs the optical signal having a wavelength different from that of the dummy light being output from the first dummy light source 110. Further, in this occasion, the switching units 150 and 260 causes the optical signal from the first light transmitting unit 130 to propagate to the second light receiving unit 270 via the transmission line 300 other than the transmission line in which the dummy light from the first dummy light source 110 propagates, among the plurality of transmission lines 300.

The second light receiving unit 270 receives the optical signal from the first light transmitting unit 130, and notifies the second dummy light source 210 of the attenuation amount included in the optical signal (S105).

The second dummy light source 210 adjusts the intensity of the dummy light, based on the notified attenuation amount (S106). With this, the dummy light with the intensity adjusted is output from the second dummy light source 210.

The first monitoring unit 180 receives the dummy light with the intensity adjusted (S107).

The first monitoring unit 180 notifies the control unit 190 of the signal quality of the received dummy light (S101).

The control unit 190 determines whether the notified signal quality of the dummy light falls within the predetermined range (S102).

When the signal quality of the dummy light falls within the predetermined range (Yes in S102), the control unit 190 stores that adjustment of intensity of the dummy light with respect to the transmission line 400 is completed. When the signal quality of the dummy light does not fall within the predetermined range (No in S102), the processing returns to S103.

As described above, the control unit 190 adjusts the intensity of the dummy light at the second dummy light source 210 for each of the transmission lines 400, based on the signal quality of the dummy light acquired by the first monitoring unit 180.

Further, the control unit 190 adjusts an intensity of the dummy light at the first dummy light source 110 for each of the transmission lines 300, based on the signal quality of the dummy light, which is acquired by the second monitoring unit 280. By using FIG. 4, explanation is made on processing (processing B) in which the control unit 190 adjusts the intensity of the dummy light at the first dummy light source 110. FIG. 4 is a flowchart illustrating an operation in the processing B.

The second monitoring unit 280 notifies the second light transmitting unit 230 of the signal quality of the dummy light received via the transmission line 300 (S201).

The second light transmitting unit 230 outputs, to the first light receiving unit 170, the optical signal on which information indicating the signal quality is superposed (S202). The first light receiving unit 170 receives the optical signal from the second light transmitting unit 230, and notifies the control unit 190 of the signal quality.

The control unit 190 determines whether the signal quality of the dummy light, which is notified from the first light receiving unit 170, falls within a predetermined range (S203).

When the signal quality of the dummy light does not fall within the predetermined range (No in S203), the control unit 190 calculates an attenuation amount according to the signal quality for each wavelength, and notifies the first dummy light source 110 (S204).

The first dummy light source 110 adjusts the intensity of the dummy light, based on the notified attenuation amount (S205). With this, the dummy light with the intensity adjusted is output from the first dummy light source 110.

The second monitoring unit 280 receives the dummy light with the intensity adjusted (S206).

When the signal quality of the dummy light falls within the predetermined range (Yes in S203), the control unit 190 stores that adjustment of intensity of the dummy light with respect to the transmission line 300 is completed (S207).

The configuration of the submarine optical communication system 1 according to the first example embodiment has been explained.

Next, by using FIG. 5, explanation is made on an operation example for adjusting an intensity of the dummy light with respect to the plurality of transmission lines 400 in the submarine optical communication system 1. Note that, at the time of starting the present operation example, the switching unit 250 is set in such a way as to output the dummy light, which is input from the second splitting unit 220, to the transmission line 400a and output multiplexed light of the optical signal and the dummy light, which is input from the second multiplexing unit 240, to the transmission line 400d. Further, the switching unit 160 is set in such a way as to output the dummy light, which is input from the transmission line 400a, to the first monitoring unit 180, and output the multiplexed light of the signal light and the dummy light, which is input from the transmission line 400d, to the first light receiving unit 170.

The second dummy light source 210 outputs the dummy light M1 (S301). The first monitoring unit 180 receives the dummy light M1 from any one of the transmission lines 400a to 400d (S302). In this occasion, the first monitoring unit 180 measures the signal quality of the received dummy light M1. In the present operation example, the first monitoring unit 180 first acquires the signal quality of the dummy light M1 that propagates in the transmission line 400a.

Subsequently, the submarine optical communication system 1 adjusts the intensity of the dummy light with respect to the transmission line 400 by the processing A described above (S303). Note that the dummy light in the processing A in S303 refers to the dummy light M1.

The control unit 190 detects whether the intensity of the dummy light M1 with respect to all the transmission lines 400 is adjusted in the processing A in S303 described above (S304). When the control unit 190 determines that the intensity of the dummy light M1 is adjusted with respect to all the transmission lines 400 (Yes in S304), processing in S307 to be described later is executed.

Further, when it is not determined that the intensity of the dummy light M1 is adjusted with respect to all the transmission lines 400 (No in S304), the control unit 190 instructs the switching units 250 and 160 to switch a connection destination (S305). Specifically, the control unit 190 instructs the transmission line 400 for which the intensity of the dummy light is not adjusted, as a connection destination, with respect to the switching units 250 and 160. For example, when, in S103, adjustment of intensity of the dummy light with respect to the transmission line 400a is completed, the control unit 190 instructs any one of the transmission lines 400b, 400c, and 400d as a connection destination.

In response to the instruction from the control unit 190, the switching units 250 and 160 switch the connection destination (S306). Specifically, the switching unit 250 connects the input port, which is connected to the second splitting unit 220, to the transmission line 400 instructed as a connection destination. Further, the switching unit 160 connects the output port with respect to the first monitoring unit 180, to the transmission line 400 instructed as a connection destination. With this, the first monitoring unit 180 receives the dummy light from the second dummy light source 210 via the transmission line 400 instructed as a connection destination.

In this occasion, when, in the switching unit 250, the transmission line 400 being a connection destination of the input port with respect to the second multiplexing unit 240 and the transmission line 400 being a connection destination of the input port with respect to the second splitting unit 220 are the same, the input port with respect to the second multiplexing unit 240 is connected to the transmission line 400 for which adjustment of intensity of the dummy light M1 is already completed. With this, the multiplexed light being output from the second multiplexing unit 240 and the dummy light M1 being output from the second splitting unit 220 do not propagate in the same transmission line 400, and hence can be prevented from interfering with each other.

Note that the control unit 190 instructs the switching unit 160 to switch the connection destination by using a line, which is not illustrated, provided in the first terminal station 100. Further, the control unit 190 causes the first optical transmission unit 130 to transmit the optical signal, which is modulated with an electric signal indicating an instruction for switching the connection destination, to the second light receiving unit 270. Further, the second light receiving unit 270 notifies the switching unit 260 of the instruction for switching the connection destination, and thus the control unit 190 is capable of instructing the switching unit 260 to switch the connection destination.

After the processing in S306, the first monitoring unit 180 receives the dummy light M1 via the transmission line 400 for which the intensity of the dummy light M1 is not adjusted (S302).

When the control unit 190 determines that the intensity of the dummy light M1 is adjusted with respect to all the transmission lines 400 (Yes in S304), the second dummy light source 210 outputs the dummy light M2 (S307). The first monitoring unit 180 receives the dummy light M2 from any one of the transmission lines 400a to 400d (S308).

Subsequently, the submarine optical communication system 1 adjusts an intensity of dummy light with respect to the transmission line 400 by the processing A described above (S309). Note that the dummy light in the processing A in S309 refers to the dummy light M2.

The control unit 190 detects whether the intensity of the dummy light M2 is adjusted with respect to all the transmission lines 400 by the processing A in S309 described above (S310).

Further, when it is not determined that the intensity of the dummy light M2 is adjusted with respect to all the transmission lines 400 (No in S310), the control unit 190 instructs the switching units 250 and 160 to switch the connection destination, similarly to the processing in S305 (S311).

Similarly to the processing in S306, in response to the instruction from the control unit 190, the switching units 250 and 160 switch the connection destination (S312).

In the processing in S308 after the processing in S312, the first monitoring unit 180 receives the dummy light M2 via the transmission line 400 for which the intensity of the dummy light M2 is not adjusted (S308). When the control unit 190 determines that the intensity of the dummy light M2 is adjusted with respect to all the transmission lines 400 (Yes in S310), an operation for acquiring the signal quality of the dummy light propagating in the plurality of transmission lines 400 is terminated.

Next, by using FIG. 6, explanation is made on an operation example for adjusting the intensity of the dummy light with respect to the plurality of transmission lines 300 in the submarine optical communication system 1. Note that, at the time of starting the present operation example, the switching unit 150 is set in such a way as to output the dummy light, which is input from the first splitting unit 120, to the transmission line 300a and output the multiplexed light of the optical signal and the dummy light, which is input from the first multiplexing unit 140, to the transmission line 300d. Further, the switching unit 260 is set in such a way as to output the dummy light, which is input from the transmission line 300a, to the second monitoring unit 280 and output the multiplexed light of signal light and dummy light, which is input from the transmission line 300d, to the second light receiving unit 270.

The first dummy light source 110 outputs the dummy light M1 (S401). The second monitoring unit 280 receives the dummy light M1 from any one of the transmission lines 300a to 300d (S402). In this occasion, the second light receiving unit 270 measures the signal quality of the received dummy light M1. In this operation example, the second monitoring unit 280 first acquires the signal quality of the dummy light M1 that propagates in the transmission line 300a.

Subsequently, the submarine optical communication system 1 adjusts the intensity of the dummy light with respect to the transmission line 300 by the processing B described above (S403). Note that the dummy light in the processing B in S403 refers to the dummy light M1.

The control unit 190 detects whether the intensity of the dummy light M1 is adjusted with respect to all the transmission lines 300 by the processing B in S403 described above (S404). When the control unit 190 determines that the intensity of the dummy light M1 is adjusted with respect to all the transmission lines 300 (Yes in S404), processing in S407 to be described later is executed.

Further, when it is not determined that the intensity of the dummy light M1 is adjusted with respect to all the transmission lines 300 (No in S404), the control unit 190 instructs the switching units 150 and 260 to switch the connection destination (S405). Specifically, the control unit 190 instructs the transmission line 300 for which the intensity of the dummy light is not adjusted, as a connection destination with respect to the switching units 150 and 260. For example, when, in S403, adjustment of intensity of the dummy light with respect to the transmission line 300a is completed, the control unit 190 instructs any one of the transmission lines 300b, 300c, and 300d as a connection destination.

In response to the instruction from the control unit 190, the switching units 150 and 260 switch the connection destination (S406). Specifically, the switching unit 150 connects the input port with respect to the first splitting unit 120, to the transmission line 300 that is instructed as a connection destination. Further, the switching unit 260 connects the output port with respect to the second monitoring unit 280, to the transmission line 300 instructed as a connection destination. In this occasion, when, in the switching unit 150, the transmission line 300 being a connection destination of the input port with respect to the first multiplexing unit 140 and the transmission line 300 being a connection destination of the input port with respect to the first splitting unit 120 are the same, the connection destination of the input port with respect to the first multiplexing unit 140 is switched to the transmission line 300 for which adjustment of intensity of the dummy light M1 is already completed. With this, the multiplexed light being output from the first multiplexing unit 140 and the dummy light M1 being output from the first splitting unit 120 do not propagate in the same transmission line 300, and hence can be prevented from interfering with each other.

Note that the control unit 190 instructs the switching unit 150 to switch the connection destination by using a line, which is not illustrated, provided in the first terminal station 100. Further, the control unit 190 causes the first light transmitting unit 130 to transmit the optical signal, which is modulated with the electric signal indicating an instruction for switching the connection destination, to the second light receiving unit 270. Further, the second light receiving unit 270 notifies the switching unit 260 of the instruction for switching the connection destination, and thus the control unit 190 is capable of instructing the switching unit 260 to switch the connection destination.

After the processing in S406, the second monitoring unit 280 receives the dummy light M1 via the transmission line 300 for which the intensity of the dummy light M1 is not adjusted (S402).

When the control unit 190 determines that the intensity of the dummy light M1 is adjusted with respect to all the transmission lines 300 (Yes in S404), the first dummy light source 110 outputs the dummy light M2 (S407). The second monitoring unit 280 receives the dummy light M2 via any one of the transmission lines 300a to 300d (S408).

Subsequently, the submarine optical communication system 1 adjusts an intensity of dummy light with respect to the transmission line 300 by the processing B described above (S409). Note that the dummy light in the processing B in S409 refers to the dummy light M2.

The control unit 190 detects whether the intensity of the dummy light M2 is adjusted with respect to all the transmission lines 300 by the processing B in S409 describe above (S410). When the control unit 190 determines that the intensity of the dummy light M2 is adjusted with respect to all the transmission lines 300 (Yes in S410), adjustment of intensity of the dummy light being output to the plurality of transmission lines 300 is terminated.

Further, when it is not determined that the intensity of the dummy light M2 is adjusted with respect to all the transmission lines 300 (No in S410), the control unit 190 instructs the switching units 150 and 260 to switch the connection destination, similarly to the processing in S405 (S411).

Similarly to the processing in S406, in response to the instruction from the control unit 190, the switching units 150 and 260 switch the connection destination (S412).

In the processing in S408 after the processing in S412, the second monitoring unit 280 receives the dummy light M2 via the transmission line 300 for which the intensity of the dummy light M2 is not adjusted.

Note that, in the explanation given above, it is assumed that the submarine optical communication system 1 adjusts the intensity of the dummy light in S303 in FIGS. 5 and S403 in FIG. 6. However, when it is only required to acquire the signal quality of the dummy light and adjustment of intensity of the dummy light is not required, the submarine optical communication system 1 may not execute the processing S303 in FIGS. 5 and S403 in FIG. 6. In this case, in S304 in FIGS. 5 and S404 in FIG. 6, it is determined whether the signal quality of the dummy light transmitted via all the transmission lines 300 is acquired.

The operation for adjusting the intensity of the dummy light being output to the plurality of transmission lines 300 in the submarine optical communication system 1 has been explained above.

As described above, the submarine optical communication system 1 includes the first terminal station 100 and the second terminal station 200 connected to the first terminal station 100 via the submarine cable 500. The submarine cable 500 accommodates at least two transmission lines 300 and at least one transmission line 400. The first terminal station 100 includes the first dummy light source 110, the first light transmitting unit 130, and the first monitoring unit 180. The second terminal station 200 includes the second dummy light source 210, the second monitoring unit 280, and the second light receiving unit 270. The first monitoring unit 180 monitors the signal quality (first signal quality) of the dummy light acquired from the second terminal station 200 via the first transmission line (transmission line 400). The first dummy light source 110 outputs the dummy light to the second terminal station 200 via the second transmission line (transmission line 300). The first light transmitting unit 130 transmits an optical signal including the signal quality of the dummy light, which is acquired by the first monitoring unit 180, to the second terminal station 200 via the third transmission line (transmission line 300). The second dummy light source 210 outputs the dummy light to the first monitoring unit 180 via the first transmission line (transmission line 400). The second monitoring unit 280 monitors the signal quality of the dummy light acquired from the first dummy light source 110 via the second transmission line (transmission line 300). The second light receiving unit 270 receives the optical signal from the first light transmitting unit 130 from the third transmission line (transmission line 300).

As described above, in the submarine optical communication system 1, the first terminal station 100 outputs both the dummy light, which is output to the second terminal station 200, and the optical signal from the second terminal station 200, which includes the signal quality of the dummy light, to the second terminal station 200 via the submarine cable 500. Specifically, the second dummy light source 210 outputs the dummy light to the first monitoring unit 180 via the transmission line 400. Further, the first dummy light source 110 outputs the dummy light to the second monitoring unit 280 via the transmission line 300. Further, the first light transmitting unit 130 outputs the optical signal to the second light receiving unit 270 via another transmission line 300. With this, the submarine optical communication system 1 readily enables communication between the terminal stations. For example, even when it is required to cause only the dummy light to propagate in the transmission line 300 and the transmission line 400 being measurement targets for the purpose of measuring transmission characteristics of the transmission lines between the first terminal station 100 and the second terminal station 200 before an operation of the submarine optical communication system 1, the optical signal is output by using another transmission line 300, and thus communication can be established between the terminal stations without using a line outside the submarine optical communication system 1.

Further, the second dummy light source 210 adjusts the intensity of the dummy light to be output to the first monitoring unit 180, based on the signal quality included in the optical signal being output from the first light transmitting unit 130. For example, the intensity of the dummy light being output from the second dummy light source 210 is adjusted based on the signal quality of the dummy light at the time of reception on a side of the first terminal station 100, and thus the second dummy light source 210 is capable of outputting dummy light having appropriate signal quality at the time of reception. Further, when the submarine optical communication system 1 is operated, an optical signal having an intensity based on a spectrum shape of the dummy light being output from the second dummy light source 210 is output from an optical transponder, which is used at the time of operation. With this, the optical signal having appropriate signal quality can be transmitted from the second terminal station 200 to the first terminal station 100.

Further, the first terminal station 100 includes the first splitting unit 120 and the first multiplexing unit 140. The first splitting unit 120 splits the dummy light from the first dummy light source 110. The first multiplexing unit 140 multiplexes the dummy light split by the first splitting unit 120 and the optical signal from the first light transmitting unit 130, and outputs resultant light of multiplexing to the second light receiving unit 270 in the second terminal station 200.

In the submarine optical communication system 1, the transmission line that connects the first terminal station 100 and the second terminal station 200 to each other is provided with an optical amplifier that amplifies an input optical signal to have certain intensity and outputs a resultant signal of amplifying. In general, in submarine optical communication, a Wavelength Division Multiplexing (WDM) optical signal is used. Thus, the optical amplifier amplifies total power of the optical signal included in a WDM optical signal to have certain intensity. Meanwhile, when an optical signal having one wavelength is input to the optical amplifier as described above, the optical amplifier amplifies the power of the optical signal having one wavelength to the above-mentioned certain level that is set according to the WDM optical signal. As a result, the power of the optical signal having one wavelength, which is amplified by the optical amplifier, has significantly higher power than the optical signal having each of the wavelengths included in the WDM signal amplified by the optical amplifier. In the optical fiber to be used in submarine optical communication, when an optical signal having a wavelength with significantly high power enters, a nonlinear optical effect is caused. When the nonlinear effect is caused, the signal quality is disadvantageously affected, which is not desirable.

Meanwhile, in the submarine optical communication system 1, the optical signal being output from the first light transmitting unit 130 is multiplexed with the dummy light split by the first splitting unit 120, and is output as a WDM signal. Thus, the optical amplifier amplifies the WDM signal acquired by multiplexing the optical signal and the dummy light, and hence occurrence of the nonlinear optical effect is suppressed. Further, the dummy light to be multiplexed by the first multiplexing unit 140 with the optical signal from the first light transmitting unit 130 and the dummy light being output from the first splitting unit 120 to the switching unit 150 are output from the same light source. Thus, in the submarine optical communication system 1, there is no need to add a dummy light source for outputting dummy light for the purpose of suppressing occurrence of the nonlinear optical effect.

Further, the first light transmitting unit 130 outputs an optical signal having a wavelength different from that of the dummy light from the first dummy light source 110. With this, when the first multiplexing unit 140 multiplexes the dummy light and the optical signal, the dummy light and the optical signal can be prevented from interfering with each other.

Further, the first dummy light source 110 switches a wavelength of the dummy light to be output. The first light transmitting unit 130 controls the wavelength of the optical signal in such a way that, when the first dummy light source 110 switches the wavelength of the dummy light, the wavelength of the optical signal is different from the wavelength of the dummy light being output from the first dummy light source 110. For example, in a case where the first dummy light source 110 outputs the dummy light M1 illustrated in FIG. 2, and the first light transmitting unit 130 outputs the optical signal having the wavelength $\lambda 8$, when the first dummy light source switches the dummy light from the dummy light M1 to the dummy light M2, the first light transmitting unit 130 switches the wavelength of the optical signal from the wavelength $\lambda 8$ to the wavelength $\lambda 9$. With this, even when the wavelength of the dummy light is switched, the dummy light and the optical signal can be prevented from interfering with each other at the time of multiplexing the dummy light and optical signal by the first multiplexing unit 140.

Note that the submarine optical communication system 1 according to the first example embodiment includes the switching units 150, 160, 250, and 260 in order to acquire the signal quality of the optical signal transmitted via the plurality of transmission lines 300 and the plurality of transmission lines 400. However, when there is no need to acquire the signal quality of the optical signal propagating via the plurality of transmission lines 300 and the plurality of transmission lines 400, the submarine optical communication system 1 may not include the switching units 150, 160, 250, and 260.

Further, the submarine optical communication system 1 according to the first example embodiment includes the second light transmitting unit 230 and the first light receiving unit 170 in order to notify the first terminal station 100 of the signal quality of the optical signal propagating via the transmission line 300. Meanwhile, when there is no need to notify the first terminal station 100 of the signal quality of the optical signal propagating via the transmission line 300, the submarine optical communication system 1 may not include the second light transmitting unit 230 and the first light receiving unit 170.

Further, the submarine optical communication system 1 according to the first example embodiment includes the second splitting unit 220 and the second multiplexing unit 240 in order to multiplex the optical signal being output from the second light transmitting unit 230 with the dummy light from the second dummy light source 210. Meanwhile, when there is no need to multiplex the optical signal being output from the second light transmitting unit 230 with the dummy light from the second dummy light source 210, the submarine optical communication system 1 may not include the second splitting unit 220 and the second multiplexing unit 240.

The submarine optical communication system 1 has been explained above.

Second Example Embodiment

Figure 7:
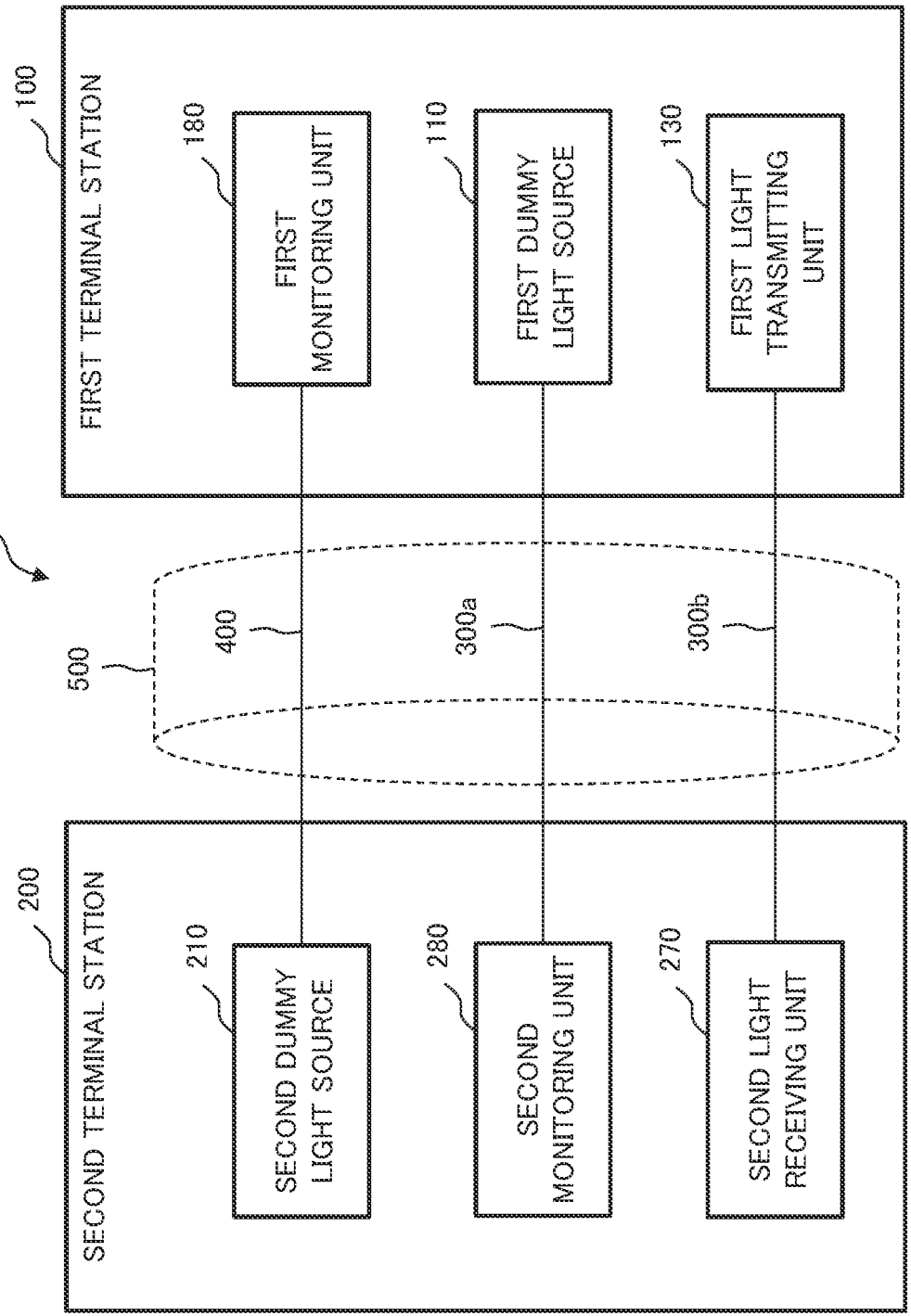
FIG. 7 is a block diagram illustrating a configuration example of a submarine optical communication system according to a second example embodiment of the present invention.
Figure 8:
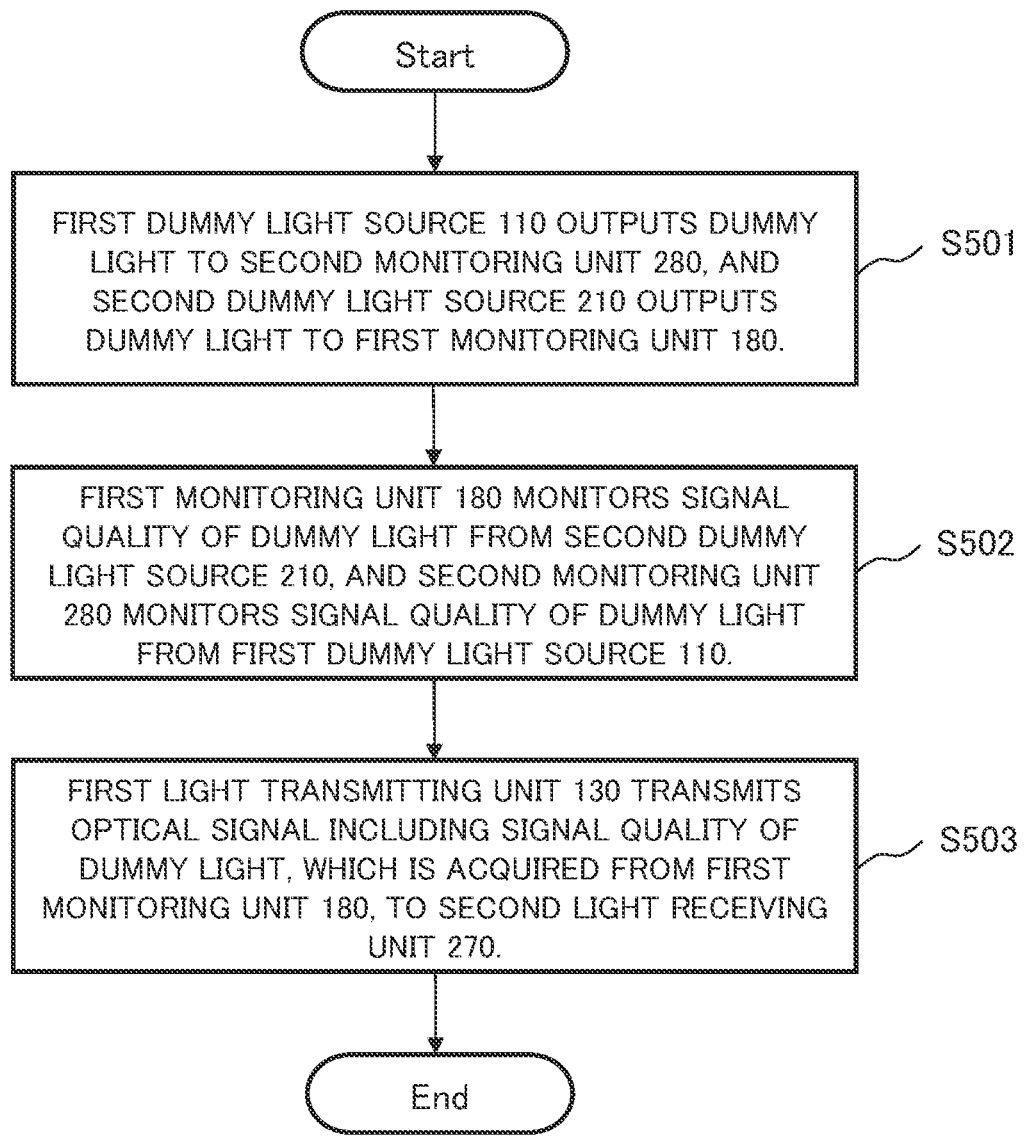
FIG. 8 is a flowchart illustrating an operation example of the submarine optical communication system according to the second example embodiment of the present invention.

A submarine optical communication system 2 according to a second example embodiment is explained based on FIG. 7 and FIG. 8. FIG. 7 is a block diagram illustrating a configuration example of the submarine optical communication system 2. Further, FIG. 8 is a flowchart for explaining an operation example of the submarine optical communication system 2.

A configuration of the submarine optical communication system 2 is explained. The submarine optical communication system 2 includes a first terminal station 100, a second terminal station 200, and a submarine cable 500. Note that the first terminal station 100 in the submarine optical communication system 2 is acquired by omitting the switching unit 150, the switching unit 160, the first light receiving unit 170, and the control unit 190 from the first terminal station 100 in the submarine optical communication system 1. Further, the second terminal station 200 in the submarine optical communication system 2 is acquired by omitting the switching unit 250, the switching unit 260, and the second light receiving unit 270 from the second terminal station 200 in the submarine optical communication system 2. Further, the first terminal station 100 and the second terminal station 200 are connected to each other via the submarine cable 500. The submarine cable 500 accommodates transmission lines 300a, 300b, and 400.

As illustrated in FIG. 7, the first terminal station 100 includes a first dummy light source 110, a first light transmitting unit 130, and a first monitoring unit 180.

The first dummy light source 110 outputs dummy light to the second terminal station 200. Specifically, the first dummy light source 110 outputs the dummy light to the second monitoring unit 280 via the transmission line 300a.

The first monitoring unit 180 monitors signal quality of the dummy light from the second terminal station 200. Specifically, the first monitoring unit 180 receives the dummy light from the second dummy light source 210 in the second terminal station 200, and monitors the signal quality of the received dummy light.

The first light transmitting unit 130 transmits, to the second terminal station 200, an optical signal including the signal quality of the dummy light acquired by the first monitoring unit 180. Specifically, the first light transmitting unit 130 superposes an electric signal, which indicates the signal quality monitored by the first monitoring unit 180, on the optical signal, and outputs a resultant signal of superposing to the second light receiving unit 270 in the second terminal station via the transmission line 300b.

As illustrated in FIG. 7, the second terminal station 200 includes a second dummy light source 210, a second light receiving unit 270, and a second monitoring unit 280.

The second dummy light source 210 outputs dummy light to the first terminal station 100. Specifically, the second dummy light source 210 outputs the dummy light to the first monitoring unit 180 via the transmission line 400.

The second light receiving unit 270 receives the optical signal from the first light transmitting unit 130.

The second monitoring unit 280 monitors signal quality of the dummy light from the first terminal station 100. Specifically, the second monitoring unit 280 receives the dummy light from the first dummy light source 110 in the first terminal station 100, and monitors the signal quality of the received dummy light.

Next, by using FIG. 8, an operation of the submarine optical communication system 2 is explained.

The first dummy light source 110 outputs the dummy light to the second monitoring unit 280, and the second dummy light source 210 outputs the dummy light to the first monitoring unit 180 (S501).

The first monitoring unit 180 monitors the signal quality of the dummy light from the second dummy light source 210, and the second monitoring unit 280 monitors the signal quality of the dummy light from the first dummy light source 110 (S502).

The first light transmitting unit 130 transmits, to the second light receiving unit 270, the optical signal including the signal quality of the dummy light acquired by the first monitoring unit 180 (S503).

Note that the second dummy light source 210 may adjust an intensity of the dummy light to be output, based on the signal quality of the dummy light, which is included in the optical signal received by the second light receiving unit 270.

As described above, in the submarine optical communication system 2, the first terminal station 100 outputs both the dummy light, which is output to the second terminal station 200, and the optical signal from the second terminal station 200, which includes the signal quality of the dummy light, to the second terminal station 200 via the submarine cable 500. Specifically, the second dummy light source 210 outputs the dummy light to the first monitoring unit 180 via the transmission line 400. Further, the first dummy light source 110 outputs the dummy light to the second monitoring unit 280 via the transmission line 300a. Further, the first light transmitting unit 130 outputs the optical signal to the second light receiving unit 270 via another transmission line 300b. With this, the submarine optical communication system 2 readily enables communication between the terminal stations. For example, even when only the dummy light is caused to propagate in the transmission line being a measurement target for the purpose of measuring transmission characteristics of the transmission lines between the first terminal station 100 and the second terminal station 200 before an operation of the submarine optical communication system 2, the optical signal is output by using another transmission line, and thus communication can be established between the terminal stations without using a line outside the submarine optical communication system 2.

The submarine optical communication system 2 has been explained above.

Figure 9:
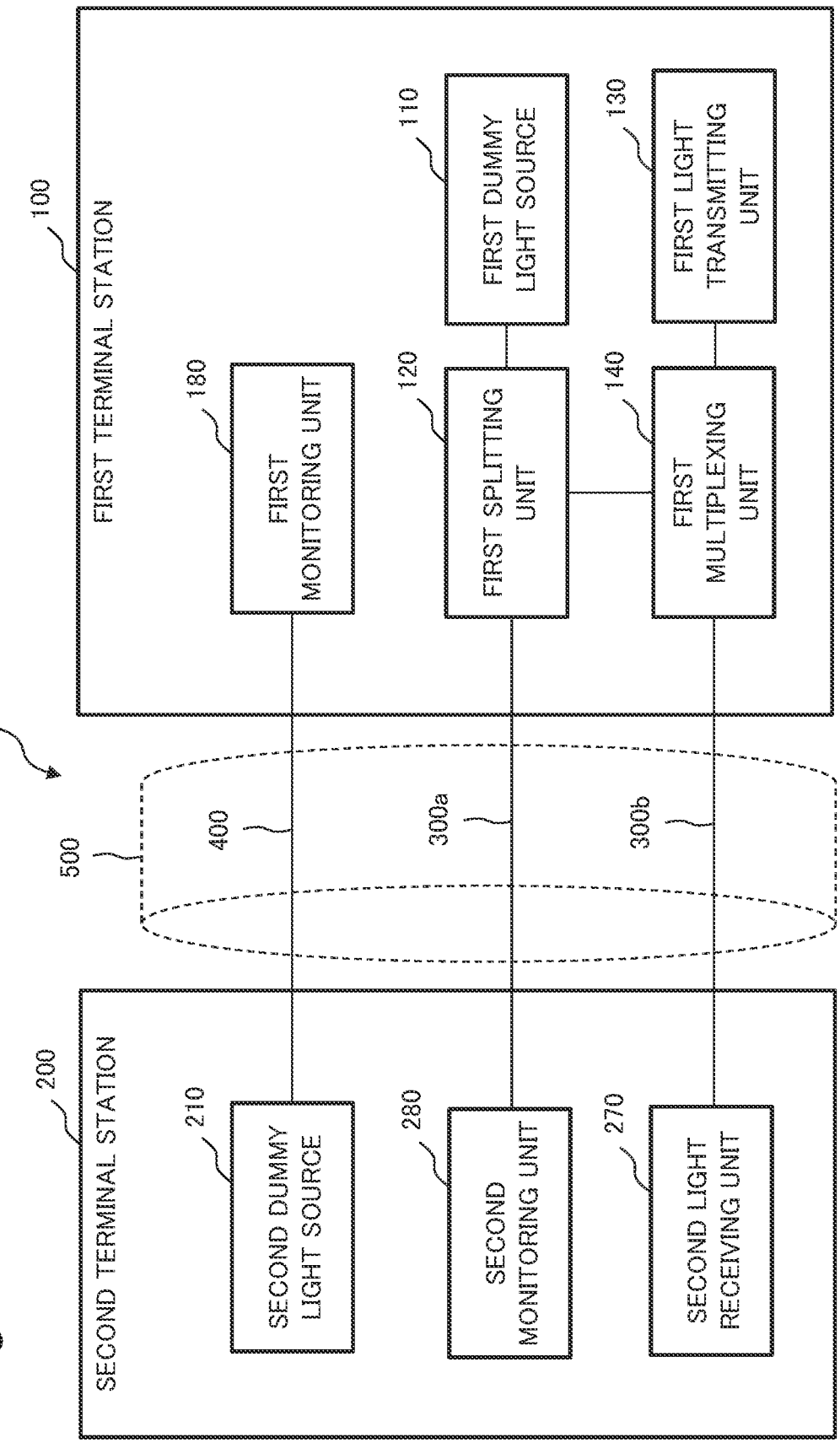
FIG. 9 is a block diagram illustrating a configuration in a modification example of the submarine optical communication system according to the second example embodiment of the present invention.

Next, a submarine optical communication system 2A is explained by using FIG. 9. FIG. 9 is a block diagram illustrating a configuration example of the submarine optical communication system 2A.

As illustrated in FIG. 9, the submarine optical communication system 2A is different from the submarine optical communication system 2 in that a first splitting unit 120 and a first multiplexing unit 140 are further included therein.

The first splitting unit 120 splits dummy light being output from a first dummy light source 110. Specifically, the first splitting unit 120 splits the dummy light, and outputs resultant light of splitting to the first multiplexing unit 140 and a transmission line 300a.

The first multiplexing unit 140 multiplexes the dummy light split by the first splitting unit 120 and an optical signal from a first light transmitting unit 130, and outputs resultant light of multiplexing to a second light receiving unit 270.

Note that an operation of the submarine optical communication system 2A is similar to the operation of the submarine optical communication system 2.

As described above, in the submarine optical communication system 2A, the optical signal being output from the first light transmitting unit 130 is multiplexed with the dummy light split by the first splitting unit 120, and is output. Thus, even when an optical amplifier provided in the transmission line amplifies a WDM signal acquired by multiplexing the optical signal and the dummy light, occurrence of a nonlinear optical effect is suppressed. Further, the dummy light, which is multiplexed by the first multiplexing unit 140 with the optical signal from the first light transmitting unit 130, and the dummy light, which is output from the first splitting unit 120 to the switching unit 150, are output from the same light source. Thus, in the submarine optical communication system 2A, there is no need to additionally provide a dummy light source for outputting the dummy light for the purpose of suppressing occurrence of the nonlinear optical effect.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-034572, filed on Mar. 2, 2020, the disclosure of which is incorporated herein in its entirety by reference.

REFERENCE SIGNS LIST

100 First terminal station
110 First dummy light source
120 First splitting unit
130 First light transmitting unit
140 First multiplexing unit
150, 160, 250, 260 Switching unit
170 First light receiving unit
180 First monitoring unit
190 Control unit
200 Second terminal station
210 Second dummy light source
220 Second splitting unit
230 Second light transmitting unit
240 Second multiplexing unit
270 Second light receiving unit
280 Second monitoring unit
300, 300a, 300b, 300c, 300d, 400, 400a, 400b, 400c, 400d Transmission line
500 Submarine cable
M1, M2 Dummy light
S1, S2 Optical signal

What is claimed is:

1. A submarine optical communication system comprising:
a first terminal station; and a second terminal station being connected to the first terminal station via a submarine cable, wherein
the submarine cable configured to accommodate a first transmission line, a second transmission line, and a third transmission line that enable light to propagate,
the first terminal station includes:
a first monitor configured to monitor first signal quality of dummy light that is acquired from the second terminal station via the first transmission line;
a first dummy light source configured to output dummy light to the second terminal station via the second transmission line; and
a light transmitter configured to transmit an optical signal to the second terminal station via the third transmission line, the optical signal including the first signal quality of dummy light from the second terminal station, and
the second terminal station includes:
a second dummy light source configured to output dummy light to the first monitor via the first transmission line;
a second monitor configured to monitor second signal quality of dummy light that is acquired from the first dummy light source via the second transmission line; and
a light receiver configured to receive the optical signal including the first signal quality from the third transmission line.

2. The submarine optical communication system according to claim 1, wherein
the second dummy light source adjusts an intensity of the dummy light to be output to the first monitor, based on the first signal quality.

3. The submarine optical communication system according to claim 1, wherein
the first terminal station further includes:
a splitter configured to split dummy light from the first dummy light source; and
a multiplexer configured to multiplex the dummy light split by the splitter and the optical signal from the light transmitter, and output resultant light of multiplexing to the light receiver in the second terminal station.

4. The submarine optical communication system according to claim 3, wherein
the light transmitter outputs the optical signal having a wavelength different from that of dummy light from the first dummy light source.

5. The submarine optical communication system according to claim 4, wherein the first dummy light source switches a wavelength of dummy light to be output, and the light transmitter controls a wavelength of the optical signal in such a way that a wavelength of the optical signal is different from a wavelength of dummy light to be output from the first dummy light source when the first dummy light source switches a wavelength of dummy light.

6. A communication method in a submarine optical communication system including: a submarine cable that accommodates a first transmission line, a second transmission line, and a third transmission line that enable light to propagate; a first terminal station; and a second terminal station being connected to the first terminal station via the submarine cable, the communication method comprising, by the first terminal station:
monitoring first signal quality of dummy light from the second terminal station, the dummy light being acquired via the first transmission line;
outputting dummy light to the second terminal station via the second transmission line; and
transmitting an optical signal to the second terminal station via the third transmission line, the optical signal including the first signal quality of dummy light from the second terminal station, and by the second terminal station:
outputting dummy light to the first terminal station via the first transmission line;
monitoring signal quality of dummy light from the first terminal station, the dummy light being acquired via the second transmission line; and
receiving the optical signal including the first signal quality from the third transmission line.

7. The communication method according to claim 6, further comprising,
by the second terminal station, adjusting an intensity of the dummy light to be output to the first terminal station, based on the first signal quality.

8. The communication method according to claim 6, further comprising,
by the first terminal station:
splitting the dummy light that is output; and
multiplexing the dummy light that is split and the optical signal, and outputting resultant light of multiplexing to the second terminal station.

9. The communication method according to claim 8, further comprising,
by the first terminal station,
outputting the optical signal having a wavelength different from that of the dummy light to be output from the first terminal station.

10. The communication method according to claim 9, further comprising,
by the first terminal station:
switching a wavelength of dummy light to be output; and
controlling a wavelength of the optical signal in such a way that a wavelength of the optical signal is different from a wavelength of the dummy light being output from the first terminal station when a wavelength of the dummy light being output from the first terminal station is switched.

* * * * *